(12) United States Patent
Nakamura et al.

(10) Patent No.: US 11,014,703 B2
(45) Date of Patent: May 25, 2021

(54) PAPER CONTAINER

(71) Applicant: NIPPON PAPER INDUSTRIES CO., LTD., Tokyo (JP)

(72) Inventors: Kouya Nakamura, Tokyo (JP); Kazuhide Onomura, Tokyo (JP); Eiichi Asoi, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 0 days.

(21) Appl. No.: 16/498,547

(22) PCT Filed: Mar. 27, 2018

(86) PCT No.: PCT/JP2018/012448
§ 371 (c)(1),
(2) Date: Sep. 27, 2019

(87) PCT Pub. No.: WO2018/181321
PCT Pub. Date: Oct. 4, 2018

(65) Prior Publication Data
US 2020/0095012 A1 Mar. 26, 2020

(30) Foreign Application Priority Data

Mar. 31, 2017 (JP) .............................. JP2017-070072

(51) Int. Cl.
*B65D 5/06* (2006.01)
*B65D 5/40* (2006.01)

(52) U.S. Cl.
CPC ............... *B65D 5/064* (2013.01); *B65D 5/40* (2013.01)

(58) Field of Classification Search
CPC .......... B65D 5/064; B65D 5/40; B65D 5/067; B65D 5/746; B65D 5/029
(Continued)

(56) References Cited

U.S. PATENT DOCUMENTS

| 6,182,887 B1* | 2/2001 | Ljunstrom ............. | B65D 5/067 206/806 |
| 7,325,719 B2* | 2/2008 | Palm ..................... | B65D 5/067 229/125.42 |

(Continued)

FOREIGN PATENT DOCUMENTS

| JP | 5-71123 | 9/1993 |
| JP | 2007-55637 | 3/2007 |

(Continued)

OTHER PUBLICATIONS

International Search Report dated May 15, 2018 in International (PCT) Application No. PCT/JP2018/012448.

*Primary Examiner* — Christopher R Demeree
(74) *Attorney, Agent, or Firm* — Wenderoth, Lind & Ponack, L.L.P.

(57) ABSTRACT

A paper container includes a body front panel (5), a body left side panel (6), a body right side panel (8), and a body back panel (7), which are contiguous through body vertical folding lines (1), (2), (3), and (4). A vertical direction sealing panel (25) is configured to form a quadrangular tubular body (26). The body vertical folding line (1) and the body vertical folding line (2) are approximately symmetrical bent lines bent toward a center of the body front panel (5), and the body vertical folding line (3) through which the body back panel and the body left side panel are contiguous with each other and the body vertical folding line (4) through which the body back panel and the body right side panel are contiguous with each other are approximately symmetrical bent lines bent toward a center of the body back panel.

12 Claims, 11 Drawing Sheets (58) Field of Classification Search
USPC ........ 229/108, 125.42, 116.1, 164, 215, 248, 229/249; 53/565
See application file for complete search history.

(56) References Cited

U.S. PATENT DOCUMENTS

| | | | | |
|---|---|---|---|---|
| 7,523,853 | B2* | 4/2009 | Kortsmit | B65D 5/067 |
| | | | | 229/108 |
| 7,934,637 | B2* | 5/2011 | Kaneko | B65D 5/064 |
| | | | | 222/81 |
| 8,584,927 | B2* | 11/2013 | Rimondi | B65B 49/08 |
| | | | | 229/125.42 |
| 9,452,859 | B2* | 9/2016 | Franic | B65D 5/067 |
| 9,611,065 | B2* | 4/2017 | Franic | B65D 5/746 |
| 2011/0113733 | A1* | 5/2011 | Franic | B65D 5/029 |
| | | | | 53/452 |

FOREIGN PATENT DOCUMENTS

| | | |
|---|---|---|
| JP | 2015-110440 | 6/2015 |
| WO | 2014/010613 | 1/2014 |

* cited by examiner

PAPER CONTAINER

TECHNICAL FIELD

The present invention relates to a paper container having a flat top-type top portion (including a brick-type paper container) and a paper container having a gable top-type top portion, which are configured to store a liquid beverage such as milk or juice.

BACKGROUND ART

Hitherto, a flat top-type paper container and a gable top-type paper container have been widely used. The flat top-type paper container includes four body panels. On a body formed into a quadrangular tubular shape through sealing with a vertical direction sealing panel, the flat top-type paper container has a top portion formed of a pair of top panels and a pair of side panels folded on an inner side of the top panels. Below the body, the flat top-type paper container has a bottom portion formed of a pair of bottom panels and a pair of inner panels folded on an inner side of the bottom panels. The gable top-type paper container has a top portion formed of a pair of gable top forming panels and a pair of gable wall forming panels folded on an inner side of the gable top forming panels. Below the body, the gable top-type paper container has a bottom portion formed of a pair of bottom panels and a pair of inner panels folded on an inner side of the bottom panels.

In the above-mentioned types of paper container, each of the body panels of the body formed in the quadrangular tubular shape generally has a flat surface. Thus, the body does not have any portion that is to be caught by fingers when the body of the paper container is grabbed. Therefore, it is unstable and difficult to keep holding the paper container. Especially when a volume of the paper container is large or water droplets are present on a surface of the paper container due to dew condensation, there is a fear in that the paper container slips and falls out of the hand.

As a paper container capable of coping with the circumstances described above, there has been proposed a paper container having a ridge, which is formed on each of body panels of a body so as to be parallel to a bottom portion. A region continuous with the ridge at a corner portion at which the body panels adjacent to each other intersect with each other, specifically, in a ridgeline portion and the vicinity thereof is formed as a recess (see, for example, JP 2007-55637 A).

The paper container described in JP 2007-55637 A is easy to grab and can be held without slippage owing to the ridge formed on each of the body panels of the body.

SUMMARY OF INVENTION

Technical Problem

The paper container described in JP 2007-55637 A is easy to grab and can be held without slippage owing to the ridge formed on each of the body panels of the body. However, the ridges project from the body of the paper container, and hence there is a problem in that the ridges may be damaged during storage and conveyance of the paper container.

Further, prevention of the slippage is influenced by a projecting height of the ridge. When the height of each of the ridges is low, the paper container is liable to be more slippery when being grabbed. Thus, in order to more reliably enhance the prevention of the slippage, it is inevitably required that the height of each of the ridges be increased. However, in a case in which the height of each of the ridges is increased, for example, when the paper containers are arranged side by side, a large gap is formed between the paper containers. Thus, the amount of storage of paper containers and the amount of conveyance of paper containers are reduced. As a result, there arises a problem in that, for example, the storage and conveyance of paper containers are adversely affected.

An object of the present invention is to provide a paper container, which is capable of preventing slippage at the time of grabbing the paper container to provide ease of holding and is less liable to adversely affect, for example, storage and conveyance of the paper container.

Solution to Problem

In order to achieve the object described above, according to a first aspect of the invention, there is provided a paper container, which is made of a paper material having a thermoplastic resin laminated on each of a front surface and a back surface thereof, the paper container including: a body front panel, a body right side panel, a body left side panel, a body back panel, which are contiguous through body vertical folding lines; a vertical direction sealing panel configured to form a quadrangular tubular body; a pair of top panels contiguous with an upper end of the body front panel and an upper end of the body back panel so as to be opposed to the body front panel and the body back panel through top portion horizontal folding lines, respectively; a pair of side panels contiguous with an upper end of the body right side panel and an upper end of the body left side panel so as to be opposed to the body right side panel and the body left side panel through top portion horizontal folding lines, respectively, the pair of top panels and the pair of side panels being folded inward and sealed so as to be tightly closed to form a top portion; and a pair of bottom panels contiguous with a lower end of the body front panel and a lower end of the body back panel so as to be opposed to the body front panel and the body back panel through bottom portion horizontal folding lines, respectively; and a pair of inner panels contiguous with a lower end of the body right side panel and a lower end of the body left side panel so as to be opposed to the body right side panel and the body left side panel through bottom portion horizontal folding lines, the pair of bottom panels and the pair of inner panels being folded inward and sealed so as to be tightly closed to form a bottom portion, wherein the body vertical folding line through which the body front panel and the body right side panel are contiguous with each other and the body vertical folding line through which the body front panel and the body left side panel are contiguous with each other are approximately symmetrical bent lines bent toward a center of the body front panel, and the body vertical folding line through which the body back panel and the body right side panel are contiguous with each other and the body vertical folding line through which the body back panel and the body left side panel are contiguous with each other are approximately symmetrical bent lines bent toward a center of the body back panel.

According to a third aspect of the invention, bent top portions of the body vertical folding lines are located above a center of the body front panel and a center of the body back panel in a vertical direction.

According to the third aspect of the invention, the body right side panel and the body left side panel have ridge portions formed at respective center portions so as to extend along a vertical direction, and the ridge portions are formed of mountain-folded vertical folding lines.

According to a fourth aspect of the invention, the body back panel, one of the top panels, which is contiguous with the upper end of the body back panel, and one of the bottom panels, which is contiguous with the lower end of the body back panel, are divided into two at a center position of each of surfaces of the body back panel, the one top panel, and the one bottom panel in the vertical direction, wherein the vertical direction sealing panel is contiguous with division edges of one divided piece of the body back panel, one divided piece of the one top panel, and one divided piece of the one bottom panel, and wherein the vertical direction sealing panel is sealed to division edges of another divided pieces to form the quadrangular tubular body.

Advantageous Effects of Invention

With the paper container described in the first aspect of the invention, the body vertical folding line through which the body front panel and the body right side panel are contiguous with each other and the body vertical folding line through which the body front panel and the body left side panel are contiguous with each other are the approximately symmetrical bent lines bent toward the center of the body front panel, and the body vertical folding line through which the body back panel and the body right side panel are contiguous with each other and the body vertical folding line through which the body back panel and the body left side panel are contiguous with each other are the approximately symmetrical bent lines bent toward the center of the body back panel. Thus, in the tubular body formed of the body front panel, the body right side panel, the body left side panel, and the body back panel, which are contiguous through the body vertical folding lines being the bent lines therebetween, each of the body front panel and the body back panel has a projecting surface on a region between the bent top portions of the body vertical folding lines opposed to each other, which is bent outward in accordance with a bent angle of each of the body vertical folding lines. Each of the body left side panel and the body right side panel has a recessed surface on a region between the bent top portions of the body vertical folding lines opposed to each other, which is bent inward in accordance with the bent angle of each of the body vertical folding lines.

At the time of holding the paper container, the body right side panel and the body left side panel forming the recessed surfaces of the tubular body are grabbed. As a result, the paper container is locked in such a manner that upper-side surfaces of the recessed surfaces of the body right side panel and the body left side panel are placed on the fingers. Thus, slippage of the paper container at the time of grabbed can be reliably prevented. Accordingly, the paper container can easily be held without being strongly grabbed.

Further, even in a case in which the body right side panel and the body left side panel forming the recessed surfaces are pushed out to deform the center portion of the body right side panel and the center portion of the body left side panel along the vertical direction into an approximately linear shape due to, for example, pressing on the body front panel and the body back panel of the tubular body from an outer side or an internal pressure of the tubular body, when the region of the body right side panel, which is located between the bent top portions of the body vertical folding lines opposed to each other, and the region of the body left side panel, which is located between the bent top portions of the body vertical folding lines opposed to each other, are grabbed so as to be pressed, the body right side panel and the body left side panel are elastically deformed to form the recessed surfaces. Accordingly, the paper container can easily be held.

Further, the tubular body does not have ridges as those formed on a paper container described in JP 2007-55637 A. Thus, there is no fear of, for example, adversely affecting storage and conveyance of the paper container.

According to a second aspect of the invention, the bent top portions of the body vertical folding lines are located above the center of the body front panel and the center of the body back panel in the vertical direction. Thus, the paper container can be held in a stable state.

According to the third aspect of the invention, the body right side panel and the body left side panel have the ridge portions formed at respective center portions so as to extend along the vertical direction, and the ridge portions are formed of mountain-folded vertical folding lines. Thus, the ridge portions serves as ribs to prevent bulge of the body due to a weight of a liquid beverage stored therein.

At the time of holding the paper container, the ridge portion in the region of the body right panel of the tubular body, which is located between the bent top portions of the body vertical folding lines opposed to each other, and the ridge portion in the region of the body left panel, which is located between the bent top portions of the body vertical folding lines opposed to each other, are grabbed so as to be pressed inward. As a result, the body right panel and the body left panel are elastically deformed to form the recessed surfaces. Thus, the paper container can easily be held.

According to the fourth aspect of the invention, the body back panel, one of the top panels, which is contiguous with the upper end of the body back panel, and one of the bottom panels, which is contiguous with the lower end of the body back panel, are divided into two at a center position of each of surfaces of the body back panel, the one top panel, and the one bottom panel in the vertical direction. The vertical direction sealing panel is contiguous with division edges of one divided piece of the body back panel, one divided piece of the one top panel, and one divided piece of the one bottom panel. The vertical direction sealing panel is sealed to division edges of another divided pieces to form the quadrangular tubular body. Accordingly, the quadrangular tubular body can easily be formed.

DESCRIPTION OF EMBODIMENTS

Figure 1:
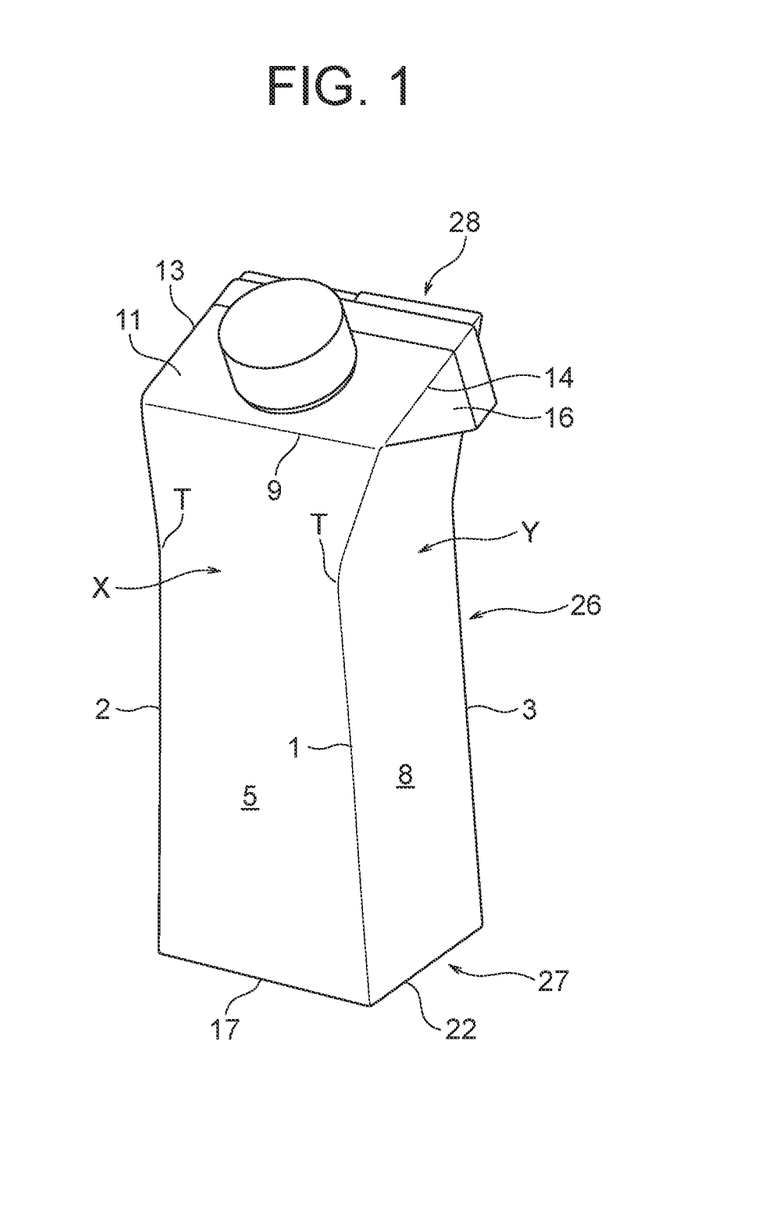
FIG. 1 is a perspective view for illustrating a first example of an embodiment of a paper container according to the present invention.
Figure 2:
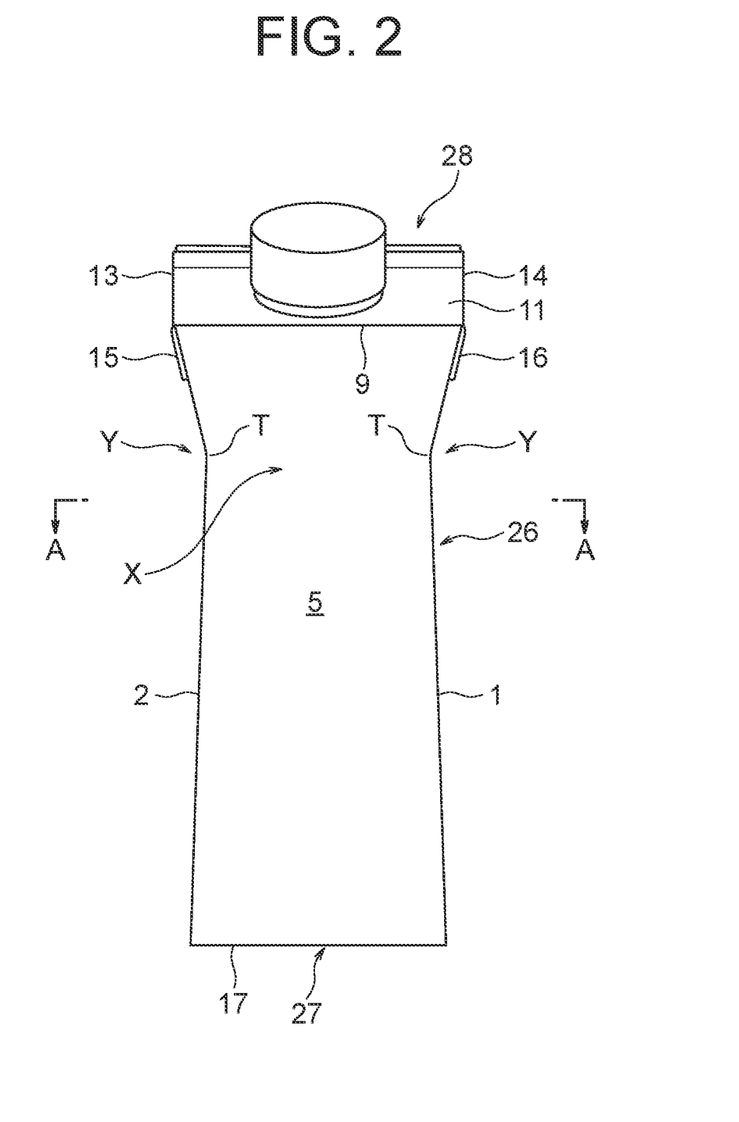
FIG. 2 is a front view of the paper container of the first example.
Figure 3:
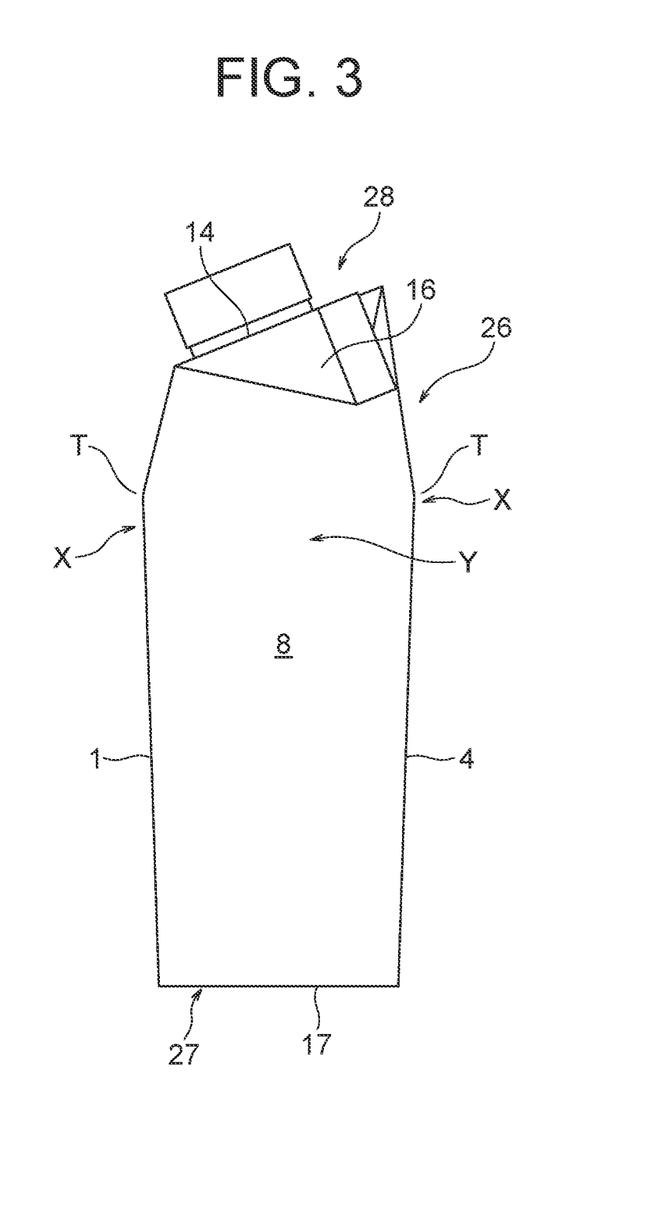
FIG. 3 is a side view of the paper container of the first example.
Figure 4:
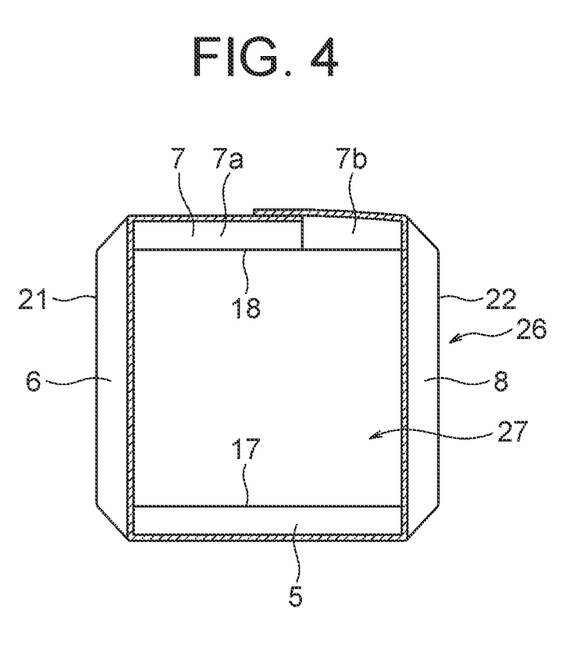
FIG. 4 is a partially omitted enlarged sectional view taken along the line A-A of FIG. 2.
Figure 5:
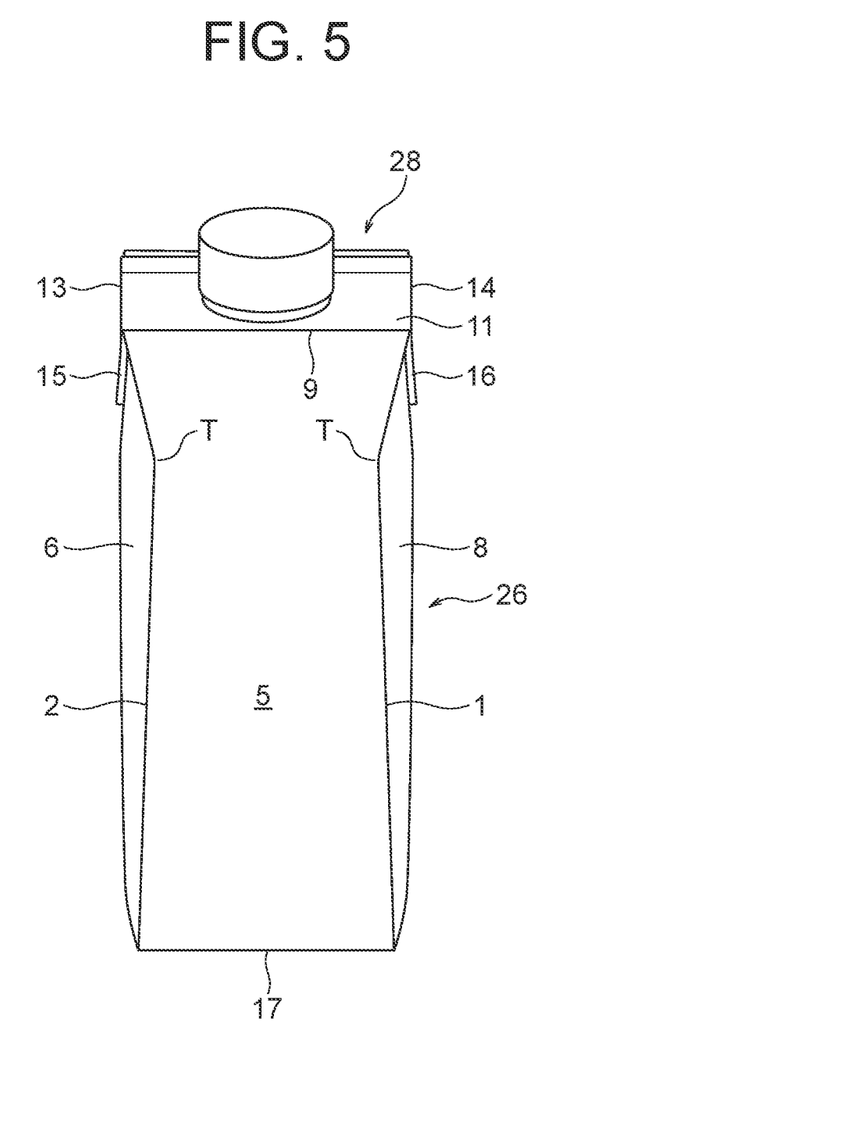
FIG. 5 is a front view for illustrating a state in which a body right panel and a body left panel of the paper container of the first example, which have been in a recessed surface shape, are pushed out to deform center portions of the body right panel and the body left panel along a vertical direction into an approximately linear shape.
Figure 6:
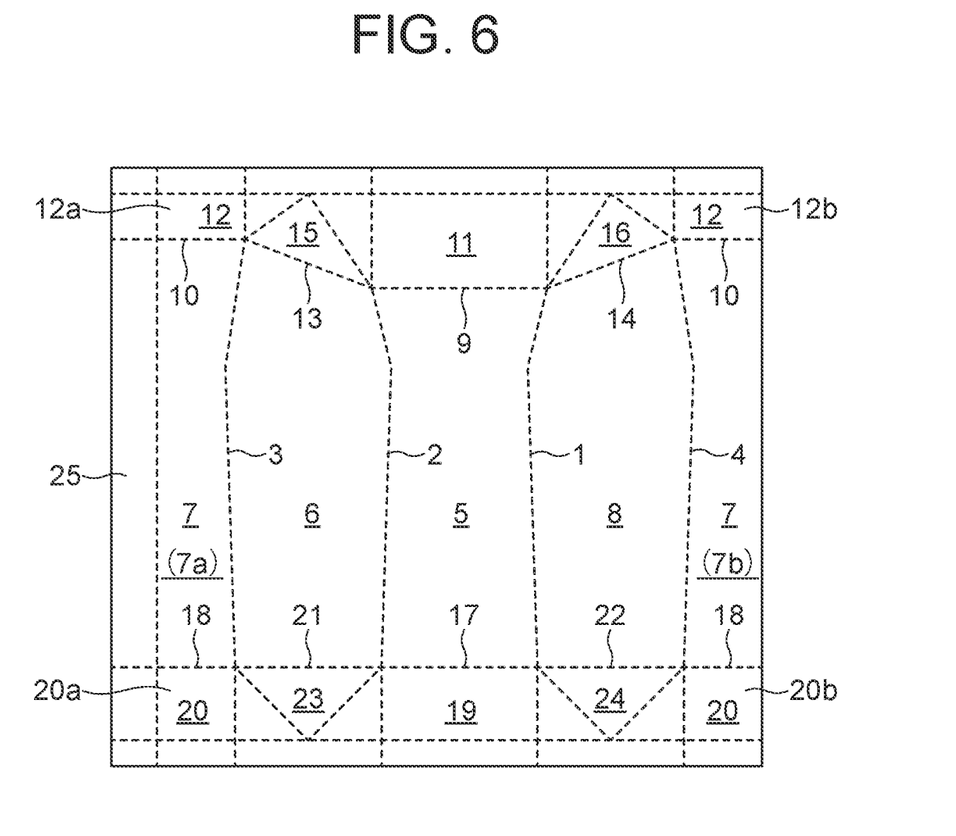
FIG. 6 is a developed view of a carton blank for assembling the paper container of the first example.

Now, a paper container according to each embodiment of the present invention is described in detail with reference to the drawings. FIG. 1 to FIG. 6 are illustrations of a first example of an embodiment of a paper container according to the present invention, in which FIG. 1 is a perspective view of the paper container of the first example. FIG. 2 is a front view of the paper container of the first example. FIG. 3 is a side view of the paper container of the first example. FIG. 4 is a partially omitted enlarged sectional view taken along the line A-A of FIG. 2. FIG. 5 is a front view for illustrating a state in which a body right panel and a body left panel of the paper container of the first example, which have been in a recessed surface shape, are pushed out to deform center portions of the body right panel and the body left panel along a vertical direction into an approximately linear shape. FIG. 6 is a developed view of a carton blank for assembling the paper container of the first example.

The paper container of the first example is a container having a flat top-type top portion, and is assembled with use of a carton blank having a development structure illustrated in FIG. 6.

The carton blank for assembling the paper container of the first example is made of a paper material having a thermoplastic resin laminated on each of a front surface and a back surface thereof. A body front panel 5, a body left side panel 6, a body back panel 7, and a body right side panel 8 are contiguous through body vertical folding lines 1, 2, 3, and 4.

A pair of top panels 11 and 12 are contiguous with an upper end of the body front panel 5 and an upper end of the body back panel 7 so as to be opposed to the body front panel 5 and the body back panel 7 through a top portion horizontal folding line 9 and a top portion horizontal folding line 10, respectively. A pair of side panels 15 and 16 are contiguous with an upper end of the body left side panel 6 and an upper end of the body right side panel 8 so as to be opposed to the body left side panel 6 and the body right side panel 8 through a top portion horizontal folding line 13 and a top portion horizontal folding line 14, respectively.

Further, a pair of bottom panels 19 and 20 are contiguous with a lower end of the body front panel 5 and a lower end of the body back panel 7 so as to be opposed to the body front panel 5 and the body back panel 7 through a bottom portion horizontal folding line 17 and a bottom portion horizontal folding line 18, respectively. A pair of inner panels 23 and 24 are contiguous with a lower end of the body left side panel 6 and a lower end of the body right side panel 8 so as to be opposed to the body left side panel 6 and the body right side panel 8 through a bottom portion horizontal folding line 21 and a bottom portion horizontal folding line 22, respectively.

Further, each of the top panel 12 contiguous with the upper end of the body back panel 7 and the bottom panel 20 contiguous with the lower end of the body back panel 7 is divided into two in a vertical direction at a center position of each of surfaces of the panels. A vertical direction sealing panel 25 to be sealed on division edges of another body back panel 7b, another top panel 12b, and another bottom panel 20b is contiguous with division edges of one body back panel 7a, one top panel 12a, and one bottom panel 20a, which are formed by the division.

Further, the body vertical folding line 1 through which the body front panel 5 and the body right side panel 8 are contiguous with each other and the body vertical folding line 2 through which the body front panel 5 and the body left side panel 6 are contiguous with each other are approximately symmetrical bent lines bent in an approximately doglegged shape toward a center of the body front panel 5. Similarly, the body vertical folding line 3 through which the body back panel 7 and the body left side panel 6 are contiguous with each other and the body vertical folding line 4 through which the body back panel 7 and the body right side panel 8 are contiguous with each other are approximately symmetrical bent lines bent in an approximately doglegged shape toward a center of the body back panel 7.

In the first example, bent top portions T of the body vertical folding lines 1, 2, 3, and 4 being the bent lines are located above a center of the body front panel 5 and a center of the body back panel 7 in the vertical direction.

For assembly of the paper container of this example with use of the carton blank having the development structure described above, the carton blank is first mountain-folded along the body vertical folding lines 1, 2, 3, and 4. Then, the vertical direction sealing panel 25 contiguous with the division edges of the one body back panel 7a, the one top panel 12a, and the one bottom panel 20a, which are formed by the division, is sealed to the division edges of the another body back panel 7b, the another top panel 12b, and the another bottom panel 20b to form a quadrangular tubular body 26.

Next, the pair of bottom panels 19 and 20, which are respectively contiguous with the lower end of the body front panel 5 and the lower end of the body back panel 7, and the pair of inner panels 23 and 24, which are respectively contiguous with the lower end of the body left side panel 6 and the lower end of the body right side panel 8 of the tubular body 26, are folded inward and sealed so as to be tightly closed to form a bottom portion 27.

Then, after a liquid beverage is filled in, the pair of top panels 11 and 12, which are respectively contiguous with the upper end of the body front panel 5 and the upper end of the body back panel 7, and the pair of side panels 15 and 16, which are respectively contiguous with the upper end of the body left side panel 6 and the upper end of the body right side panel 8, are folded inward and sealed so as to be tightly closed to form a top portion 28.

In the paper container assembled as described above, the body vertical folding line 1 through which the body front panel 5 and the body right side panel 8 are contiguous with each other and the body vertical folding line 2 through which the body front panel 5 and the body left side panel 6 are contiguous with each other are the approximately symmetrical bent lines, which are bent toward the center of the body front panel 5, and the body vertical folding line 3 through which the body back panel 7 and the body left side panel 6 are contiguous with each other and the body vertical folding line 4 through which the body back panel 7 and the body right side panel 8 are contiguous with each other are the approximately symmetrical bent lines, which are bent toward the center of the body back panel 7. Thus, in the tubular body 26 formed of the body front surface 5, the body left side panel 6, the body right side panel 8, and the body back panel 7, which are contiguous through the body vertical folding lines 1, 2, 3, and 4, the body front panel 5 has a projecting surface X formed on a region between the bent top portions T of the body vertical folding lines 1 and 2, which is bent outward in accordance with bent angles of the body vertical folding lines 1 and 2. The body back panel 7 has a projecting surface X formed on a region between the bent top portions T of the body vertical folding lines 3 and 4, which is bent outward in accordance with bent angles of the body vertical folding lines 3 and 4 (see FIG. 3).

Further, the body left side panel 6 forms a recessed surface Y on a region between the bent top portions T of the body vertical folding lines 2 and 3, which is bent inward in accordance with the bent angles of the body vertical folding lines 2 and 3. The body right side panel 8 forms a recessed surface Y on a region between the bent top portions T of the body vertical folding lines 1 and 4, which is bent inward in accordance with the bent angles of the body vertical folding lines 1 and 4 (see FIG. 2).

As described above, each of the body left side panel 6 and the body right side panel 8 of the tubular body 26 forms the recessed surface Y. Thus, at the time of holding the paper container is held, the body left side panel 6 and the body right side panel 8 forming the recessed surfaces Y of the tubular body 26 are grabbed. As a result, the paper container is locked in such a manner that upper-side surfaces of the recessed surfaces Y of the body left side panel 6 and the body right side panel 8 are fingers are placed on the fingers. Thus, slippage of the paper container at the time of being grabbed can be reliably prevented.

Further, even in a case in which the body left side panel 6 and the body right side panel 8 forming the recessed surface Y are pushed out to deform the center portion of the body left side panel 6 and the center portion of the body right side panel 8 along the vertical direction into an approximately linear shape due to, for example, external pressing on the body front panel 5 and the body back panel 7 of the tubular body 26 or an internal pressure of the tubular body 26 (see FIG. 5), when the region of the body left side panel 6, which is located between the bent top portions T of the body vertical folding lines 2 and 3, and the region of the body right side panel 8, which is located between the bent top portions T of the body vertical folding lines 1 and 4 are grabbed so as to be pressed, the body left side panel 6 and the body right side panel 8 are elastically deformed to form the recessed surfaces Y. Accordingly, the paper container can easily be held.

Further, in the first example, the bent top portions T of the body vertical folding lines 1, 2, 3, and 4 being the bent lines are located above the center of the body front panel 5 and the center of the body back panel 7 in the vertical direction. Thus, the paper container can be held in a stable state.

Figure 7:
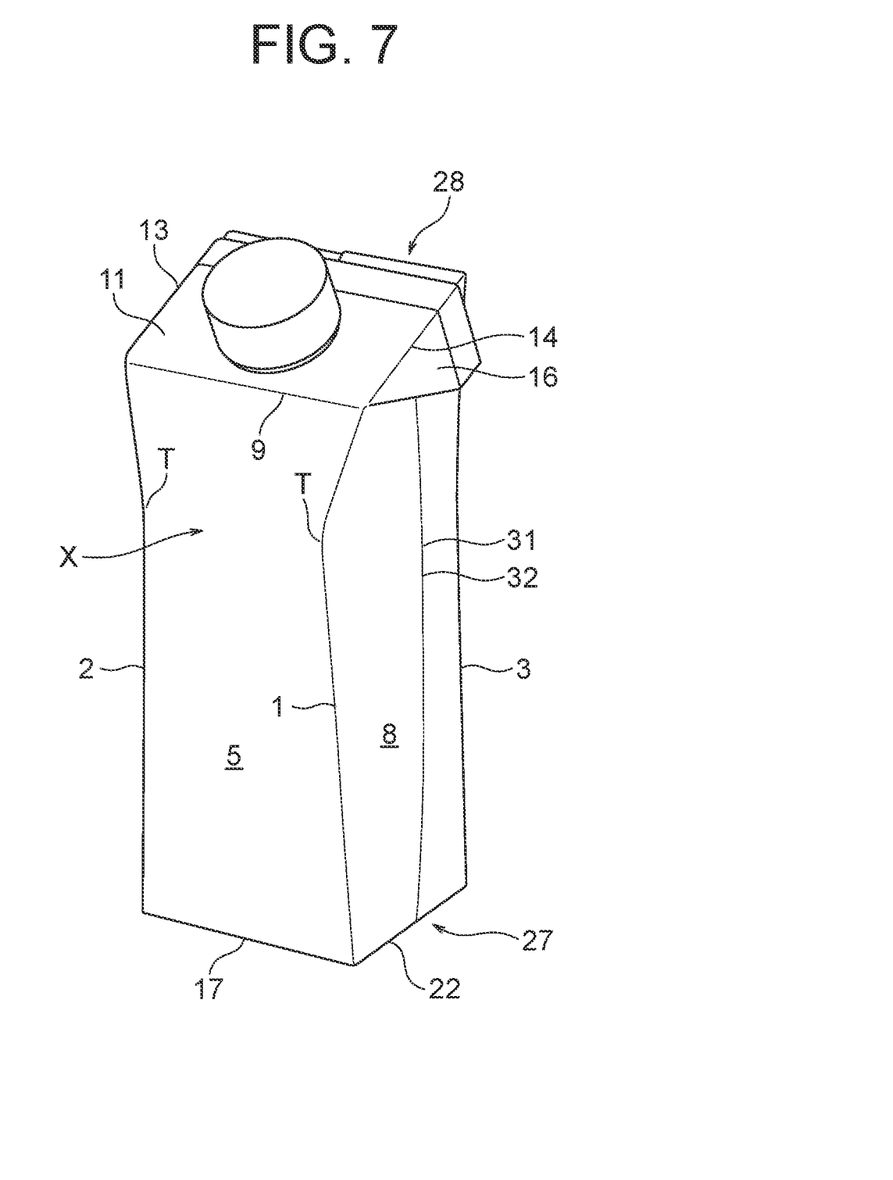
FIG. 7 is a perspective view for illustrating a second example of the embodiment of the paper container according to the present invention.
Figure 8:
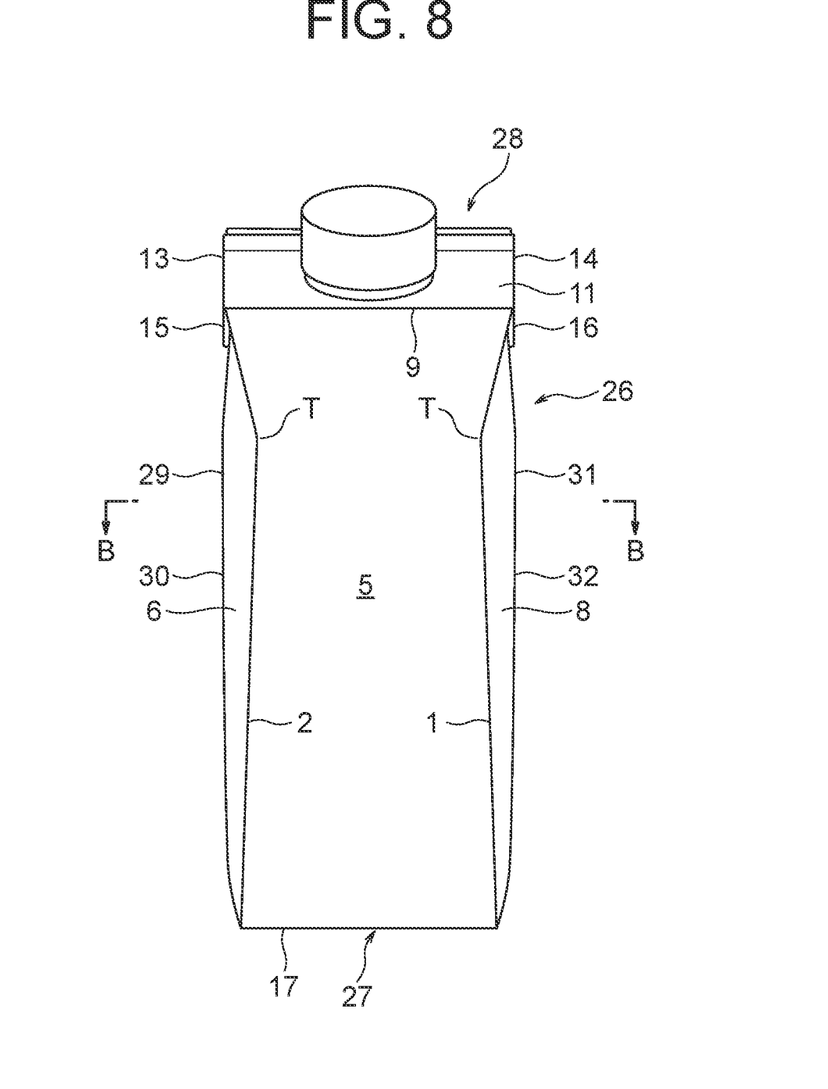
FIG. 8 is a front view of the paper container of the second example.
Figure 9:
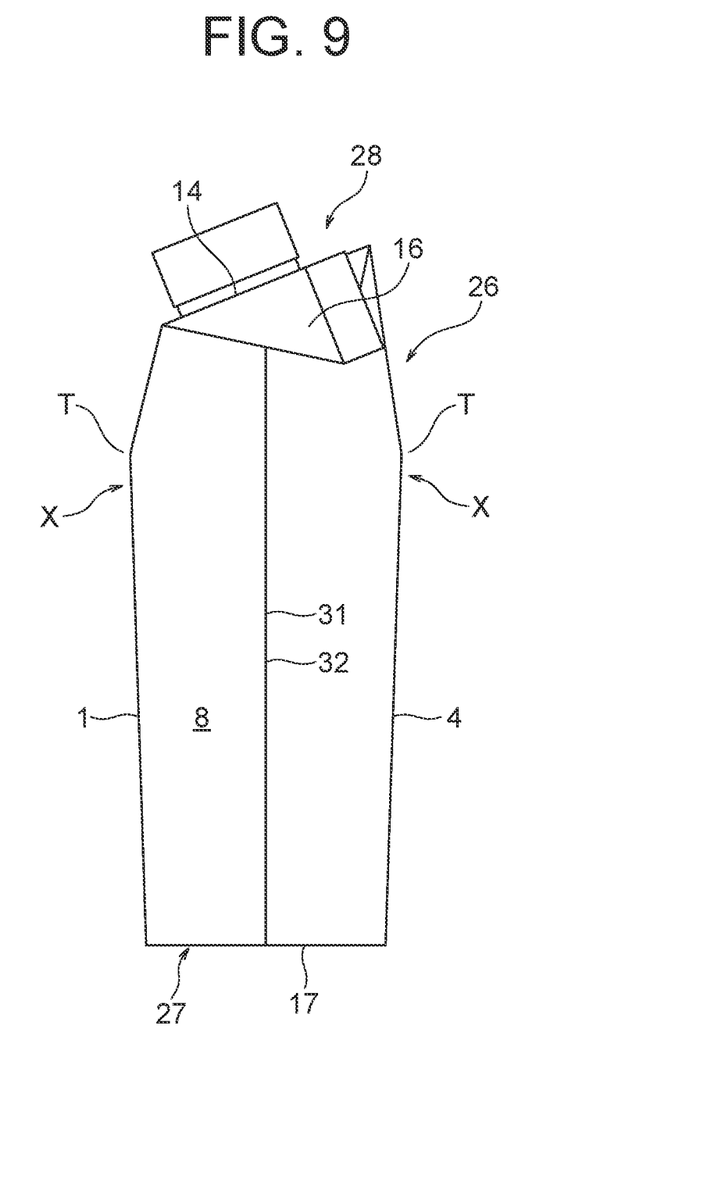
FIG. 9 is a side view of the paper container of the second example.
Figure 10:
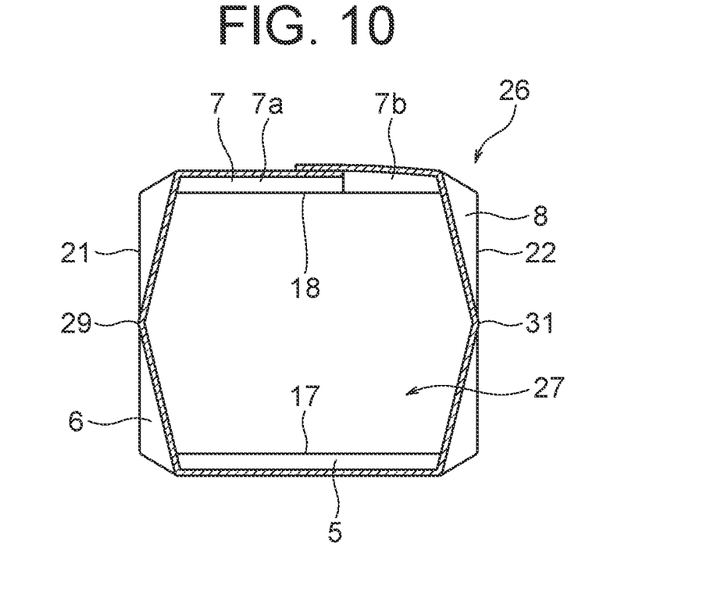
FIG. 10 is a partially omitted enlarged sectional view taken along the line B-B of FIG. 8.
Figure 11:
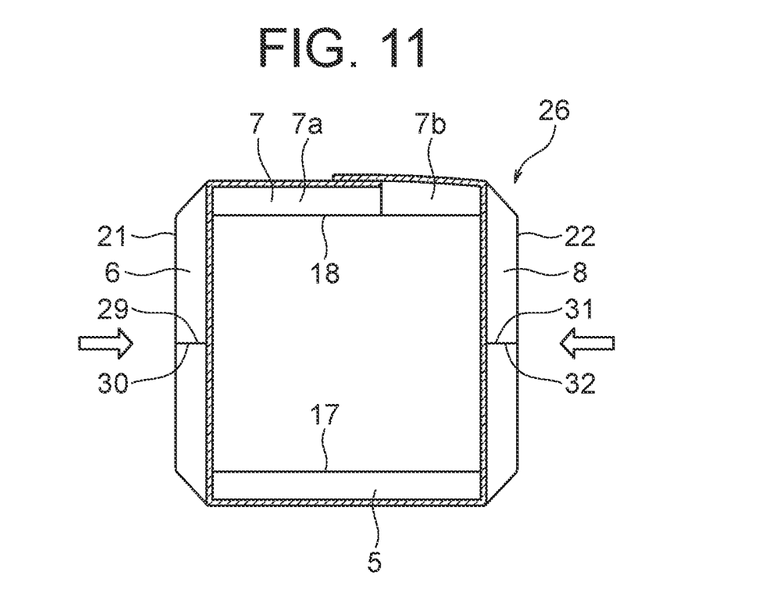
FIG. 11 is an explanatory enlarged sectional view for illustrating a state in which a body left panel and a body right panel of the paper container of the second example are pushed inward to be deformed into a recessed surface shape.
Figure 12:
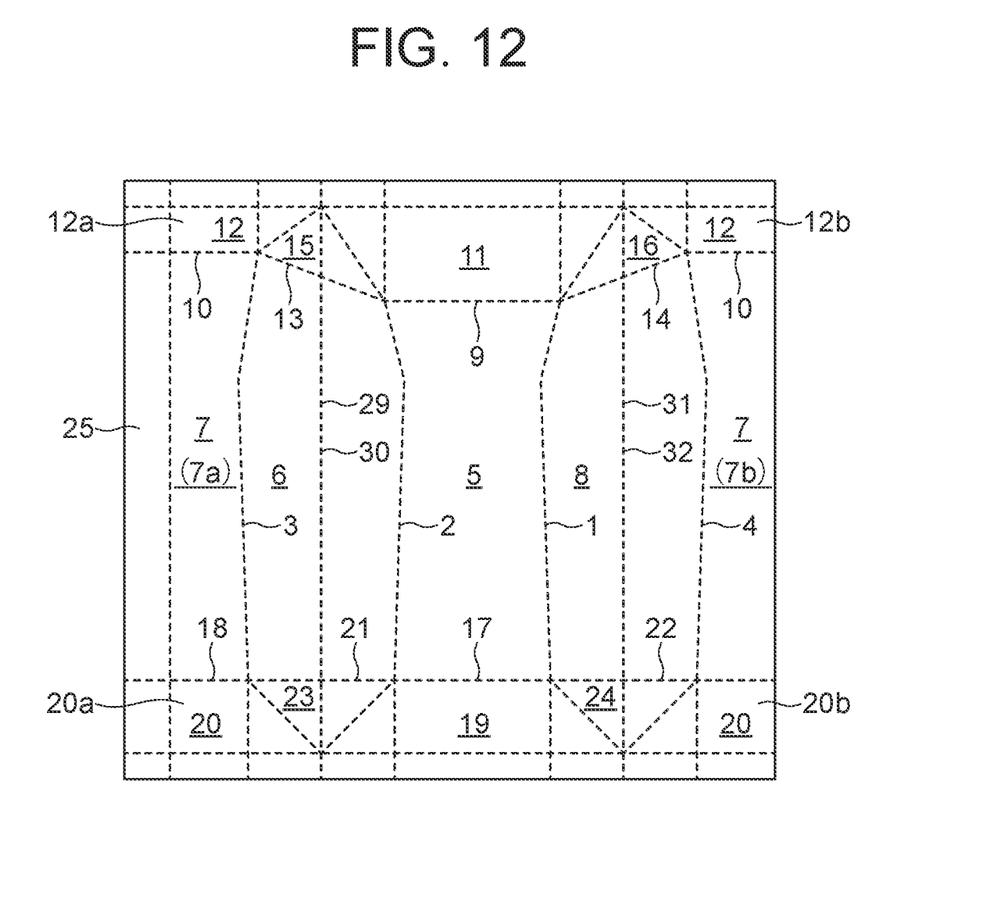
FIG. 12 is a developed view of a carton blank for assembling the paper container of the second example.

FIG. 7 to FIG. 12 are illustrations of a second example of the embodiment of the paper container according to the present invention. FIG. 7 is a perspective view for illustrating the paper container of this example. FIG. 8 is a front view of the paper container of the second example. FIG. 9 is a side view of the paper container of the second example. FIG. 10 is a partially omitted enlarged sectional view taken along the line B-B of FIG. 8. FIG. 11 is an explanatory enlarged sectional view for illustrating a state in which a body left panel and a body right panel of the paper container of the second example are pushed inward to be deformed in a recessed surface shape. FIG. 12 is a developed view of a carton blank for assembling the paper container of the second example.

The same configurations of the paper container of the second example as those of the first example are denoted by the same reference symbols, and the description thereof is omitted. Only configurations different from those of the first example are described.

The paper container of the second example is a container having a flat top-type top portion similarly to the first embodiment, and is assembled with use of a carton blank having a development structure illustrated in FIG. 12. On the carton blank for assembling the paper container of the second example, the body left side panel 6 has a vertical folding line 30 formed at a center portion along the vertical direction, which is continuous with the top portion horizontal folding line 13 and the bottom portion horizontal folding line 21. The vertical folding line 30 forms a ridge portion 29 when the carton blank is mountain-folded along the vertical folding line 30. Similarly, the body right side panel 8 has a vertical folding line 32 formed at the center portion thereof along the vertical direction, which is continuous with the top portion horizontal folding line 14 and the bottom portion horizontal folding line 22. The vertical folding line 32 forms a ridge portion 31 when the carton blank is mountain-folded along the vertical folding line 32.

The other configurations are the same as those of the carton blank of the first example, which is illustrated in FIG. 6.

For the assembly of the paper container of this example with use of the carton blank having the development structure described above, the carton blank is mountain-folded along the vertical folding line 30, which is continuous with the top portion horizontal folding line 13 and the bottom portion horizontal folding line 21 of the body left side panel 6, to thereby form the ridge portion 29 at the center portion of the body left side panel 6 along the vertical direction. Similarly, the carton blank is mountain-folded along the vertical folding line 32, which is continuous with the top portion horizontal folding line 13 and the bottom portion horizontal folding line 21 of the body right side panel 8, to thereby form the ridge portion 31 at the center portion of the body right side panel 8 along the vertical direction.

The other configurations are the same as those of the carton blank of the first example, which is illustrated in FIG. 6.

Next, similarly to the first example, the carton blank is mountain-folded along the body vertical folding lines 1, 2, 3, and 4. The vertical direction sealing panel 25 contiguous with the division edges of the one body back panel 7a, the one top panel 12a, and the one bottom panel 20a, which are formed by the division, is sealed to the division edges of the another body back panel 7b, the another top panel 12b, and the another bottom panel 20b to form the quadrangular tubular body 26.

Next, the pair of bottom panels 19 and 20, which are respectively contiguous with the lower end of the body front panel 5 and the lower end of the body back panel 7, and the pair of bottom panels 23 and 34, which are respectively contiguous with the lower end of the body left side panel 6 and the lower end of the body right side panel 8 of the tubular body 26, are folded inward and sealed so as to be tightly closed to form the bottom portion 27.

Then, after a liquid beverage is filled in, the pair of top panels 11 and 12, which are respectively contiguous with the upper end of the body front panel 5 and the upper end of the body back panel 7, and the pair of side panels 15 and 16, which are respectively contiguous with the upper end of the body left side panel 6 and the upper end of the body right side panel 8, are folded inward and sealed so as to be tightly closed to form the top portion 28.

In the paper container assembled as described above, the body vertical folding line 1 through which the body front panel 5 and the body right side panel 8 are contiguous with each other and the body vertical folding line 2 through which the body front panel 5 and the body left side panel 6 are contiguous with each other are the approximately symmetrical bent lines bent toward the center of the body front panel 5. The body vertical folding line 3 through which the body back panel 7 and the body left side panel 6 are contiguous with each other and the body vertical folding line 4 through which the body back panel 7 and the body right side panel 8 are contiguous with each other are the approximately symmetrical bent lines bent toward the center of the body back panel 7. Thus, in the tubular body 26 formed of the body front surface 5, the body left side panel 6, the body right side panel 8, and the body back panel 7, the body front panel 5 forms the projecting surface X on the region between the bent top portions T of the body vertical folding lines 1 and 2, which is bent outward in accordance with the bent angles of the body vertical folding lines 1 and 2. The body back panel 7 forms the projecting surface X formed on the region between the bent top portions T of the body vertical folding lines 3 and 4, which is bent outward in accordance with the bent angles of the body vertical folding lines 3 and 4 (see FIG. 9).

Further, the body left side panel 6 has an approximately linear center portion along the vertical direction because of the ridge portion 29 formed by the body left side panel 6 mountain-folded along the vertical folding line 30. The body left side panel 8 has an approximately linear center portion in the vertical direction because of the ridge portion 31 formed by the body right side panel 8 mountain-folded along the vertical folding line 32 (see FIG. 8).

As described above, the ridge portion 29 formed at the center portion of each of the body left side panel 6 and the body right side panel 8 along the vertical direction serves as a rib to prevent bulge of the tubular body 26, which is caused by a weight of the stored liquid beverage.

At the time of holding the paper container, the region of the body left panel 6, which is located between the bent top portion T of the body vertical folding line 2 and the bent top portion T of the body vertical folding line 3 and the region of the body right panel 8, which is located between the bent top portion T of the body vertical folding line 1 and the bent top portion T of the body vertical folding line 4 are grabbed so as to press the regions. As a result, the body left panel 6 and the body right panel 8 are elastically deformed to form the recessed surfaces Y (see FIG. 11). Thus, the paper container can easily be held.

Each of the paper container of the first example and the paper container of the second example is a paper container having a flat top-type top portion. The present invention can also be carried out for a gable top-type paper container.

REFERENCE SIGNS LIST 1, 2, 3, 4 body vertical folding line
5 body front panel
6 body left side panel
7 body back panel
7a one divided body back panel
7b another divided body back panel
8 body right side panel
9, 10 top portion horizontal folding line
11, 12 top panel
12a one top panel
12b another top panel
13, 14 top portion horizontal folding line
15, 16 side panel
17, 18 bottom portion horizontal folding line
19, 20 bottom panel
20a one bottom panel
20b another bottom panel
21, 22 bottom portion horizontal folding line
23, 24 inner panel
25 vertical direction sealing panel
26 tubular body
27 bottom portion
28 top portion
29 ridge portion
30 vertical folding line
31 ridge portion
32 vertical folding line
T bent top portion
X projecting surface
Y recessed surface

The invention claimed is:

1. A paper container, which is made of a paper material having a thermoplastic resin laminated on each of a front surface of the paper container and a back surface of the paper container, the paper container comprising:
   a body front panel, a body right side panel, a body left side panel, and a body back panel, which are contiguous through body vertical folding lines;
   a vertical direction sealing panel configured to form a quadrangular tubular body;
   a pair of top panels contiguous with an upper end of the body front panel and an upper end of the body back panel so as to be opposed to the body front panel and the body back panel through top portion horizontal folding lines, respectively;
   a pair of side panels contiguous with an upper end of the body right side panel and an upper end of the body left side panel so as to be opposed to the body right side panel and the body left side panel through top portion horizontal folding lines, respectively, the pair of top panels and the pair of side panels being folded inward and sealed so as to be closed to form a top portion; and
   a pair of bottom panels contiguous with a lower end of the body front panel and a lower end of the body back panel so as to be opposed to the body front panel and the body back panel through bottom portion horizontal folding lines, respectively; and
   a pair of inner panels contiguous with a lower end of the body right side panel and a lower end of the body left side panel so as to be opposed to the body right side panel and the body left side panel through bottom portion horizontal folding lines, the pair of bottom panels and the pair of inner panels being folded inward and sealed so as to be closed to form a bottom portion,
   wherein the body vertical folding line through which the body front panel and the body right side panel are contiguous with each other and the body vertical folding line through which the body front panel and the body left side panel are contiguous with each other are bent lines bent toward a center of the body front panel, and the body vertical folding line through which the body back panel and the body right side panel are contiguous with each other and the body vertical folding line through which the body back panel and the body left side panel are contiguous with each other are bent lines bent toward a center of the body back panel.

2. The paper container according to claim 1, wherein bent top portions of the body vertical folding lines being the bent lines are located above the center of the body front panel and the center of the body back panel in a vertical direction.

3. The paper container according to claim 2, wherein the body right side panel and the body left side panel have ridge portions at respective center portions so as to extend along the vertical direction, and the ridge portions are defined by mountain-folded vertical folding lines.

4. The paper container according to claim 3,
wherein the body back panel, one of the top panels, which is contiguous with the upper end of the body back panel, and one of the bottom panels, which is contiguous with the lower end of the body back panel, are divided into two at a center position of each of surfaces of the body back panel, the one of the top panels, and the one of the bottom panels in the vertical direction,
wherein the vertical direction sealing panel is contiguous with division edges of a first divided piece of the body back panel, a first divided piece of the one of the top panels, and a first divided piece of the one of the bottom panels, and
wherein the vertical direction sealing panel is sealed to division edges of at least one of a second divided piece of the body back panel, a second divided piece of the one of the top panels, or a second divided piece of the one of the bottom panels to form the quadrangular tubular body.

5. The paper container according to claim 2,
wherein the body back panel, one of the top panels, which is contiguous with the upper end of the body back panel, and one of the bottom panels, which is contiguous with the lower end of the body back panel, are divided into two at a center position of each of surfaces of the body back panel, the one of the top panels, and the one of the bottom panels in the vertical direction,
wherein the vertical direction sealing panel is contiguous with division edges of a first divided piece of the body back panel, a first divided piece of the one of the top panels, and a first divided piece of the one of the bottom panels, and
wherein the vertical direction sealing panel is sealed to division edges of at least one of a second divided piece of the body back panel, a second divided piece of the one of the top panels, or a second divided piece of the one of the bottom panels to form the quadrangular tubular body.

6. The paper container according to claim 1, wherein the body right side panel and the body left side panel have ridge portions at respective center portions so as to extend along a vertical direction, and the ridge portions are defined by mountain-folded vertical folding lines.

7. The paper container according to claim 6,
wherein the body back panel, one of the top panels, which is contiguous with the upper end of the body back panel, and one of the bottom panels, which is contiguous with the lower end of the body back panel, are divided into two at a center position of each of surfaces of the body back panel, the one of the top panels, and the one of the bottom panels in the vertical direction,
wherein the vertical direction sealing panel is contiguous with division edges of a first divided piece of the body back panel, a first divided piece of the one of the top panels, and a first divided piece of the one of the bottom panels, and
wherein the vertical direction sealing panel is sealed to division edges of at least one of a second divided piece of the body back panel, a second divided piece of the one of the top panels, or a second divided piece of the one of the bottom panels to form the quadrangular tubular body.

8. The paper container according to claim 1,
wherein the body back panel, one of the top panels, which is contiguous with the upper end of the body back panel, and one of the bottom panels, which is contiguous with the lower end of the body back panel, are divided into two at a center position of each of surfaces of the body back panel, the one of the top panels, and the one of the bottom panels in a vertical direction,
wherein the vertical direction sealing panel is contiguous with division edges of a first divided piece of the body back panel, a first divided piece of the one of the top panels, and a first divided piece of the one of the bottom panels, and
wherein the vertical direction sealing panel is sealed to division edges of at least one of a second divided piece of the body back panel, a second divided piece of the one of the top panels, or a second divided piece of the one of the bottom panels to form the quadrangular tubular body.

9. The paper container according to claim 1,
wherein the body front panel has a projecting surface on a region between bent top portions of the body vertical folding lines opposed to each other, which is bent outward in accordance with bent angles of the body vertical folding lines, and
wherein the body back panel has a projecting surface on a region between bent top portions of the body vertical folding lines opposed to each other, which is bent outward in accordance with bent angles of the body vertical folding lines.

10. The paper container according to claim 1, wherein the body vertical folding line through which the body front panel and the body right side panel are contiguous with each other and the body vertical folding line through which the body front panel and the body left side panel are symmetrical.

11. The paper container according to claim 10, wherein the body vertical folding line through which the body back panel and the body right side panel are contiguous with each other and the body vertical folding line through which the body back panel and the body left side panel are contiguous with each other are symmetrical.

12. The paper container according to claim 1, wherein the body vertical folding line through which the body back panel and the body right side panel are contiguous with each other and the body vertical folding line through which the body back panel and the body left side panel are contiguous with each other are symmetrical.

* * * * *